United States Patent
Hinchman et al.

(10) Patent No.: US 10,672,327 B1
(45) Date of Patent: Jun. 2, 2020

(54) LOW-PROFILE DISPLAY ASSEMBLY FOR A VEHICLE AND CONFIGURED TO DISPLAY COMPUTER-GENERATED IMAGERY AT THE FRONT OF THE ASSEMBLY

(71) Applicant: JVIS USA, LLC, Sterling Heights, MI (US)

(72) Inventors: David Donovan Hinchman, Livonia, MI (US); Donald Richard Schaffer, Waterford, MI (US); Shawn Robert Williams, Auburn Hills, MI (US)

(73) Assignee: JVIS-USA, LLC, Sterling Heights, MI (US)

( * ) Notice: Subject to any disclaimer, the term of this patent is extended or adjusted under 35 U.S.C. 154(b) by 36 days.

(21) Appl. No.: 16/237,951

(22) Filed: Jan. 2, 2019

(51) Int. Cl.
  *G09G 3/32* (2016.01)
  *B60Q 3/74* (2017.01)
  *B60Q 3/51* (2017.01)
  *B60R 13/02* (2006.01)
  *B60Q 3/80* (2017.01)

(52) U.S. Cl.
  CPC .......... *G09G 3/32* (2013.01); *B60Q 3/51* (2017.02); *B60Q 3/74* (2017.02); *B60Q 3/80* (2017.02); *B60R 13/0212* (2013.01); *G09G 2380/10* (2013.01)

(58) Field of Classification Search
  CPC ........ G09G 3/32; G09G 2380/10; B60Q 3/51; B60Q 3/80; B60Q 3/74; B60Q 13/0212
  See application file for complete search history.

(56) References Cited

U.S. PATENT DOCUMENTS

| | | | |
|---|---|---|---|
| 5,895,115 A | 4/1999 | Parker et al. | |
| 6,158,867 A | 12/2000 | Parker et al. | |
| 9,834,136 B2 * | 12/2017 | Roberts | B60Q 1/2615 |
| 2013/0181398 A1 * | 7/2013 | Stellenberg | A63F 7/027 273/121 A |
| 2018/0190046 A1 | 7/2018 | Levinson et al. | |
| 2018/0218669 A1 * | 8/2018 | Huebner | H05K 1/0274 |
| 2018/0222383 A1 | 8/2018 | Mueller et al. | |
| 2018/0257557 A1 | 9/2018 | Bruegl | |
| 2018/0281701 A1 | 10/2018 | Preisler et al. | |

FOREIGN PATENT DOCUMENTS

GB 2492100 A 12/2012

* cited by examiner

*Primary Examiner* — Robert J Michaud
(74) *Attorney, Agent, or Firm* — Brooks Kushman P.C.

(57) ABSTRACT

A low-profile display assembly for a vehicle is provided. The assembly includes a substrate having a plurality of holes extending completely therethrough. The assembly further includes at least one lighting display panel and a plurality of semiconductor-based, lighting devices supported and mounted thereon. Each of the lighting devices includes multicolored lighting elements. Each of the lighting elements is individually addressable to control the luminous intensity of the lighting elements. Each of the lighting devices is aligned with one of the holes so that light emitted by each of the lighting devices travels through its hole to the front of the assembly in the form of a pixel of a computer-generated image. Color of light emitted by each of the lighting devices is controlled by controlling the luminous intensity of light emitted by its lighting elements.

20 Claims, 15 Drawing Sheets

LOW-PROFILE DISPLAY ASSEMBLY FOR A VEHICLE AND CONFIGURED TO DISPLAY COMPUTER-GENERATED IMAGERY AT THE FRONT OF THE ASSEMBLY

TECHNICAL FIELD

This invention generally relates to display assemblies for vehicles and, in particular, to low-profile display assemblies for vehicles and configured to display computer-generated imagery at the front of the assemblies.

OVERVIEW

Many molded parts are used in the interior of vehicles. The substrate of the part is often made of plastic or of a fibrous molding material.

Natural fiber composite panels utilized as a substrate have very important characteristics because of their light weight and high environmental sustainability.

The substrate of the molded part may be realized in a laminar fashion and has an essentially plane contour or a three-dimensional contour with convex and concave regions defined by the respective design, as well as, if applicable, one or more openings and recesses. In order to fix the molded parts in the passenger compartment or on the vehicle door and to mount handles, control elements and storage trays on the molded part, the molded part is also equipped with mounting parts that are also referred to as retainers.

The substrate typically consists of plastics or composite materials that contain plastics such as acrylonitrile-butadiene-styrene (ABS) or polypropylene (PP). Fibrous molding materials on the basis of textile fabrics of hemp, sisal, flax, kenaf, and/or wood components such as wood fibers, wood dust, wood chips or paper bound with duroplastic binders are likewise used as material for the substrate. Foamed materials of polyurethane or epoxy resins that, if applicable, are reinforced with natural fibers or glass fibers may also be considered as material for the substrate.

The side of the respective molded part or substrate that faces the vehicle interior is usually referred to as the visible side. In order to provide the visible side with an attractive appearance, the substrate is equipped with one or more decorative elements of a textile material or a plastic film. The plastic films are used for this purpose are usually colored and have a relief-like embossed surface. If applicable, the decorative elements comprise a cushioning layer of a foamed plastic that faces the substrate and provides the molded part with pleasantly soft haptics. The decorative elements are usually laminated onto the substrate or bonded thereto during the manufacture of the substrate by means of thermoplastic back-injection molding.

On its edge and/or on an installation side that lies opposite of the visible side, the substrate is advantageously equipped with projections, depressions and bores. The projections, depressions and bores serve for non-positively connecting the molded part to sections of the car body such as a car door or the roof of a passenger compartment by means of retaining elements such as clips, pins and screws.

The term "facing material" refers to a material used to conceal and/or protect structural and/or functional elements from an observer. Common examples of facing materials include upholstery, carpeting, and wall coverings (including stationary and/or movable wall coverings and cubicle wall coverings). Facing materials typically provide a degree of aesthetic appearance and/or feel, but they may also provide a degree of physical protection to the elements that they conceal. In some applications, it is desirable that the facing material provide properties such as, for example, aesthetic appeal (for example, visual appearance and/or feel) and abrasion resistance. Facing materials are widely used in motor vehicle construction.

In the automotive industry, it is common practice to refer to various surfaces as being A-, B-, or C-surfaces. As used herein, the term "A-surface" refers to an outwardly facing surface for display in the interior of a motor vehicle. This surface is a very high visibility surface of the vehicle that is most important to the observer or that is most obvious to the direct line of vision. With respect to motor vehicle interiors, examples include dashboards, door panels, instrument panels, steering wheels, head rests, upper seat portions, headliners, load floors and pillar coverings.

Light emitting panel assemblies in automotive applications are generally known and disclosed in U.S. Pat. Nos. 5,895,115 and 6,158,867.

As disclosed in U.S. Patent Publication No. 2018/0281701, interior lighting systems for automotive and other vehicle applications are generally used for two purposes. One is to provide general area illumination and the other is feature lighting of specific objects, either for aesthetic or functional reasons. Traditionally, these interior lighting systems have utilized incandescent lamps for both area and feature lighting, often using lenses to control the shape and light intensity distribution of the emitted light. Although incandescent lamp systems can often be integrated into various vehicle interior trim components in a simple manner, various considerations do arise which complicate their use for automotive lighting. For example, where heat from the lamp could damage adjacent components or otherwise cause problems, thermal management of that heat must be implemented. Also, there is often little room in or behind a particular vehicle interior body panel or trim component for the lamp, socket, and lensing.

More recently, distributed light systems have found use in vehicles. These may use fiber optics or other means to deliver the light to a desired location. The use of a lens and focusing or dispersing devices may be employed to direct the light.

Such areas as foot wells, door handles, seats, trunks, cargo areas, dashboards, door sills, headliners, grab handles, etc. may be illuminated using a wide combination of technologies. In addition to incandescent lights and fluorescent lighting, LED illumination, cold cathode technology, and electroluminescent technology may now find use.

Vehicles are commonly provided with various types of decorative trim parts. Vehicles also typically have various logos or designs located on interior trim pieces. However, decorative trim and designs in the vehicle cabin are difficult to perceive in darker conditions. Attempts have been made to illuminate trim logos. This is typically done by either placing the logo within the field of a light source or by making the logo element luminescent. The first method is not feasible for logos in most common locations, while the latter method may adversely affect the occupants' vision.

U.K. published patent application 2,492,100 discloses a method of fabricating an illuminated trim panel member in which the panel member comprises a trim element. The method comprises: forming, such as by laser drilling, at least one aperture completely through the trim element; and applying a layer of a light-transmitting coating medium to one side of the trim element to cover at least a portion of the one side and the aperture, whereby light may be transmitted completely through the aperture and through the layer of coating medium for viewing.

As described in Chapter 13 of the *Handbook of Laser Materials Processing* entitled "Hole Drilling," there are two ways of forming apertures or holes using laser beams: percussion drilling and trepanning. Percussion drilling is typically used for hole diameters less than 0.025 in. (0.63 mm), while trepanning is used for drilling holes of larger diameter.

Trepanning

If one uses a rotating optical device, holes up to 0.250 in. (6.25 mm) diameter can be laser drilled. So-called "boring heads" rotate the focused laser beam at very high rates. Holes are drilled by either a single pass or multiple passes of the laser beam.

Drilling by trepanning is to cut a hole around its periphery. Depending on the hole diameter, a slug may be produced. Boring heads usually use 2.5-in. focal length lenses and are equipped with gas jets similar to those used for laser cutting applications.

Roundness of the holes produced by boring heads is exact, and repeatability of hole diameter is excellent. Boring-head-hole diameter is established either manually or by use of a programmable controller.

Trepanned holes can also be drilled by interpolation of linear axes, moving either the material or the laser focusing device. Speed of drilling by interpolation is dictated by the size of the linear axes. The linear axes servo system must be properly tuned to produce circular holes. Specialty beam-manipulation devices use very small linear axes to move the focusing device in a circle. The system controller can be programmed to establish desired hole diameters.

Most nonmetals are of one of two types, characterized by their response to exposure to high-energy radiation: those that transform from a solid directly into a vapor without significant liquefaction, and those that transform from solid state into a liquid state before vaporization. Paper is an example of the former; acrylic resin is an example of the latter.

When absorbed by a material, this energy is transformed into energy associated with the motion of atoms or molecules and is capable of being transmitted through solids or fluids by conduction, that is, as heat. Most nonmetals do not conduct heat effectively. Properly applied, the effect of short, high-energy laser pulses is localized to the area of exposure. As such, each pulse of laser energy affects a volume of material consistent with the irradiance of the focuses beam and the specific heat of the material, with negligible impact to material adjacent to the area of exposure.

The total energy required to drill a hole comes from the specific gravity of a material and the volume of material which must be converted from solid to vapor. The rate at which holes can be drilled is determined by the rate at which energy can be input to the material without degrading hole quality.

Hole quality is quantified by the measures of roundness and taper; recast (material that has resolidified in the hole or around the hole entrance); or charring (usually exhibited as a carbonaceous residue). These qualities affect the function of the hole, whether it be air flow, spray pattern, or part fit.

U.S. published patent application 2018/0257557 discloses an illumination device for a motor vehicle. The device includes one or more LED units each having one or more LEDs. The LED units may be RGB LED units. U.S. published patent application 2018/0222383 discloses a motor vehicle which has a central light control device, a plurality of peripheral light control devices distributed within the vehicle, and a plurality of interior light modules each of which has a plurality of light sources and is associated with a peripheral light control device.

It is well known that combining the projected light of one color with the projected light of another color will result in the creation of a third color. It is also well known that three commonly used primary colors-red, blue and green-can be combined in different proportions to generate almost any color in the visible spectrum.

Published U.S. patent application 2018/0190046 discloses an autonomous vehicle and associated mechanical, electrical and electronic hardware, computer software and systems, wired and wireless network communications and a plurality of sensors for autonomous-vehicle operation. The sensors may comprise at least two of a LIDAR sensor, a RADAR sensor, a SONAR sensor, a camera, an IMU, an odometry sensor, a GPS sensor, or a microphone.

SUMMARY OF EXAMPLE EMBODIMENTS

An object of at least one embodiment of the present invention is to provide a low-profile display assembly for a vehicle and configured to display computer-generated imagery in the form of pixels at the front of the assembly. The imagery may take the form of images of static scenes and/or dynamic or moving images (i.e. animations).

In carrying out the above object and other objects of at least one embodiment of the present invention, a low-profile display assembly for a vehicle is provided. The assembly includes a substrate having front and rear faces and a plurality of holes extending from the rear face to the front face. At least one lighting display panel has front and rear faces. A plurality of semiconductor-based, lighting devices are supported by each of the display panels between the front face of at least one display panel and the rear face of the substrate. Each of the lighting devices includes multicolored lighting elements. Each of the lighting elements is individually addressable to control the intensity of the lighting elements. Each of the lighting devices is aligned with one of the holes so that light emitted by each of the lighting devices travels through its hole to the front of the assembly in the form of a pixel of a computer-generated image. Color of light emitted by each of the lighting devices is controlled by controlling the intensity of light emitted by its lighting elements.

The substrate may comprise a stiff, self-supporting sheet adapted to be mounted adjacent a roof of the vehicle so as to underlie the roof and shield the roof from view. The computer-generated images may be displayed within a passenger compartment of the vehicle.

Each of the lighting devices may include a control circuit to individually control each of the lighting elements.

A plurality of electrically coupled display panels may overlie the substrate.

Each of the display panels may comprise a printed circuit board.

The substrate may be a polymeric substrate such as a thermoplastic substrate.

The assembly may further comprise a porous decorative cover overlying and bonded to a front face of the substrate to create a cosmetically acceptable appearance for the assembly. Light from each of the lighting devices may be transmitted through the decorative cover to form the computer-generated images.

The decorative cover may be a decorative fabric or cloth liner attached to the front face of the substrate.

The computer-generated image may represent static scenes.

The computer-generated images may include dynamic or animated images.

The control circuit may control the color of the light emitted from the each of the lighting devices.

The control circuit may control the intensity of the light emitted from its lighting device.

Each of the lighting devices may be a point light source.

One of the computer-generated images may represent a group of celestial bodies at the front of the assembly.

The lighting elements of at least one of the lighting devices may be controlled so that its associated celestial body appears to twinkle or scintillate.

The holes may be funnel-shaped to at least partially house the lighting devices at the rear face and to direct light emitted by the lighting devices to the front face.

The substrate may be substantially black to represent a dark background for the celestial bodies.

Further in carrying out the above object and other objects of at least one embodiment of the present invention, a robust display assembly for a vehicle is provided. The assembly includes a substrate having front and rear faces and a plurality of funnel-shaped holes extending from the rear face of the substrate to the front face of the substrate. First and second sets of lighting display panels overlie the rear face of the substrate. A plurality of semiconductor-based, lighting devices are supported by each of the display panels. Each of the lighting devices include at least one lighting element. Each of the lighting elements is individually addressable to control the intensity of the at least one lighting element. Each of the lighting devices is at least partially disposed within one of the holes so that light emitted by each of the lighting devices travels through its hole to the front of the assembly in the form of a pixel of a computer-generated image.

Still further in carrying out the above object and other objects of at least one embodiment of the present invention, a low-profile display assembly for a vehicle is provided. The assembly includes a substrate having front and rear faces and a plurality of holes extending from the rear face of the substrate to the front face of the substrate. First and second, substantially identical, interconnected sets of lighting display panels overlie the rear face of the substrate. A plurality of semiconductor-based, lighting devices are supported by each of the display panels. Each of the lighting devices including at least one lighting element. Each of the lighting elements is individually addressable to control the intensity of the at least one lighting element. Each of the lighting devices is aligned with one of the holes so that light emitted by each of the lighting devices travels through its hole in the form of a pixel of a computer-generated image.

BRIEF DESCRIPTION OF DRAWING FIGURES

Figure 2:
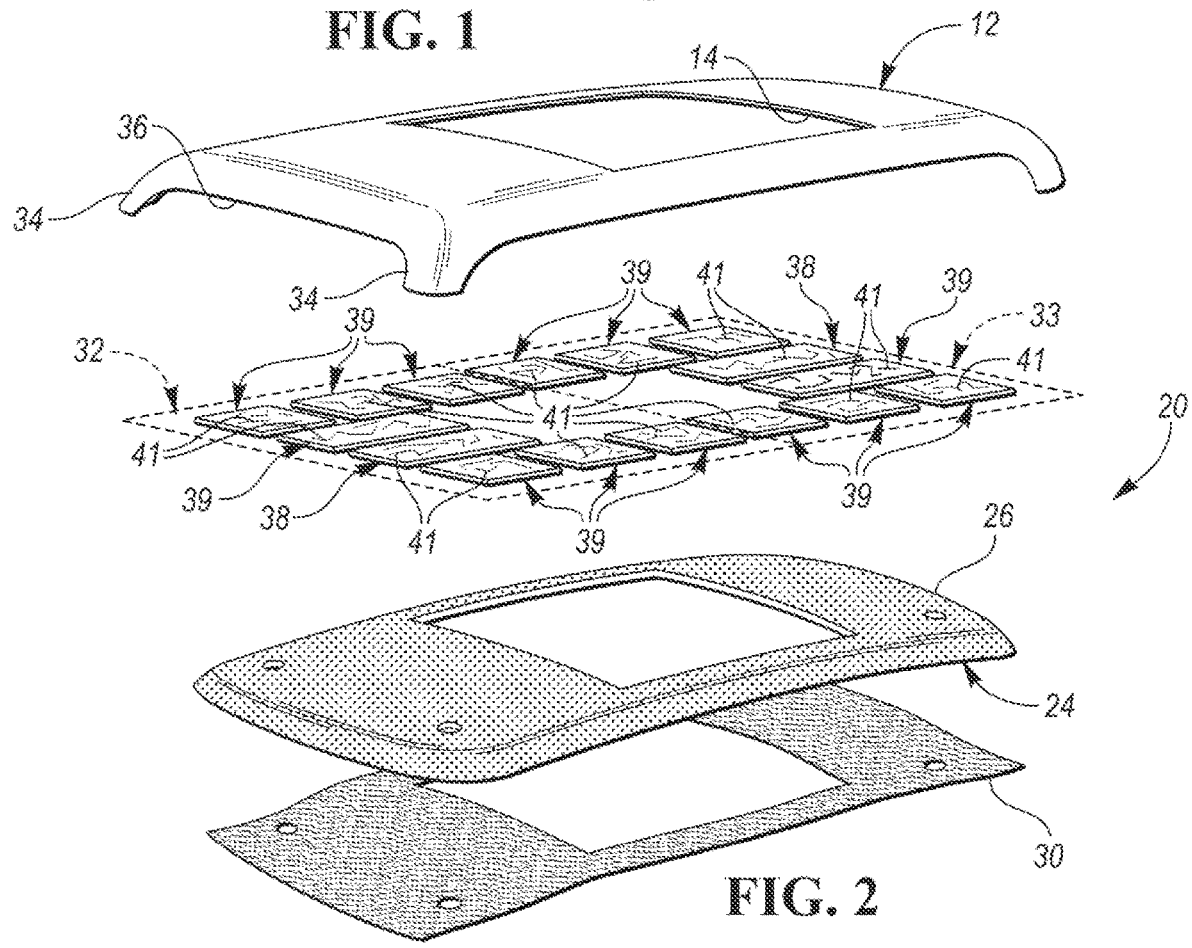
FIG. 2 is an exploded, perspective view of a low-profile display assembly constructed in accordance with at least one embodiment of the present invention and underlying a roof of the vehicle of FIG. 1.
Figure 11:
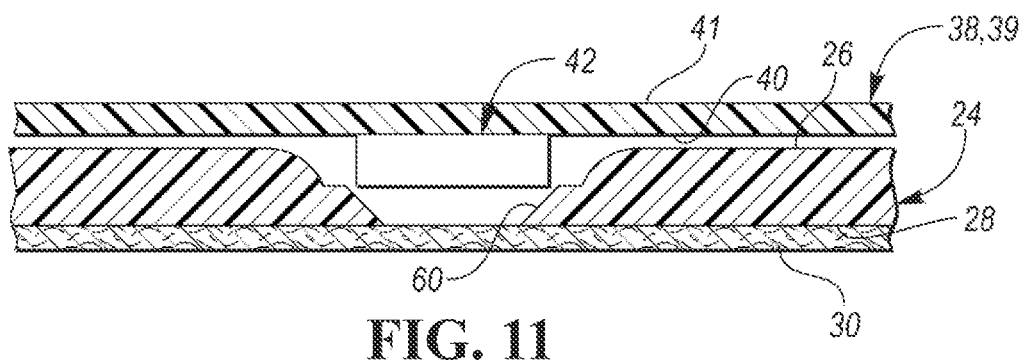
FIG. 11 is a side view, partially broken away and in cross-section, of a display assembly constructed in accordance with at least one embodiment of the present invention.
Figure 12A:
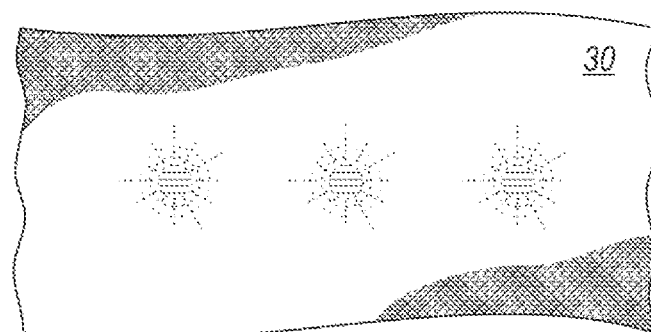
FIGS. 12A-12C are schematic bottom views of a display assembly having a porous, decorative cover layer which transmits colored light therethrough when RGB LEDs are energized.
Figure 12B:
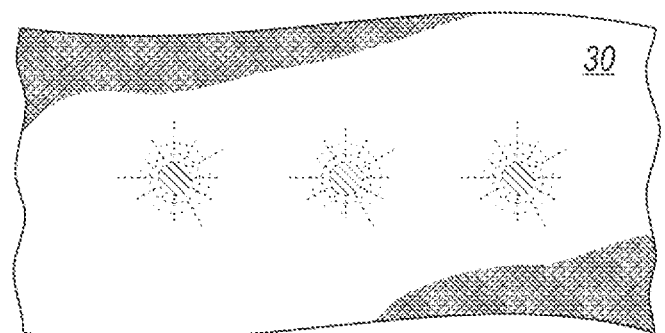
Figure 13A:
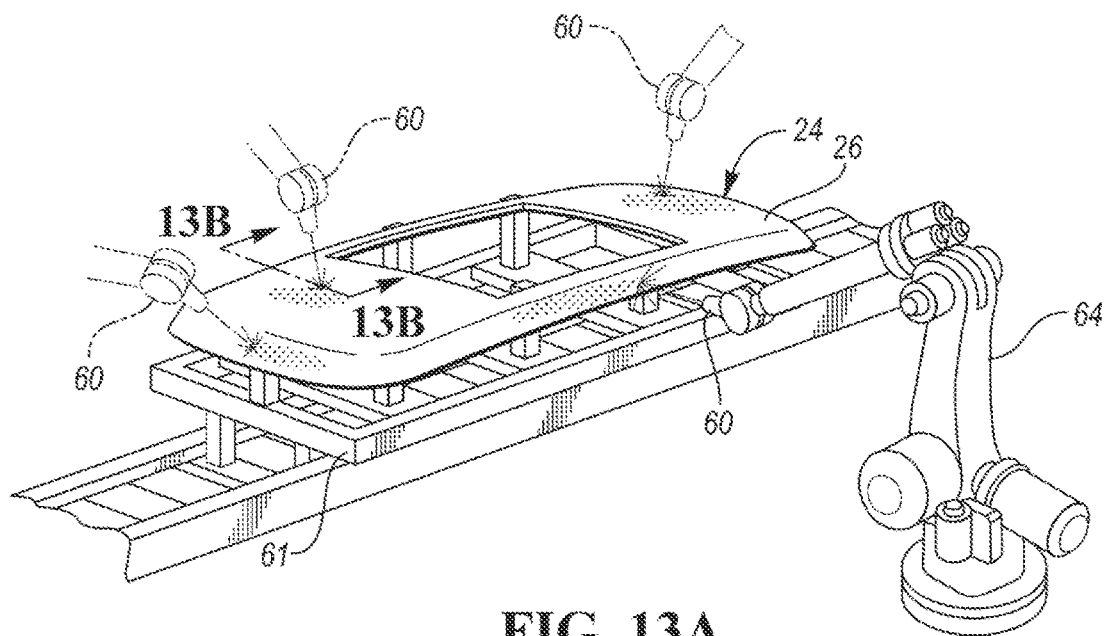
Figure 13B:
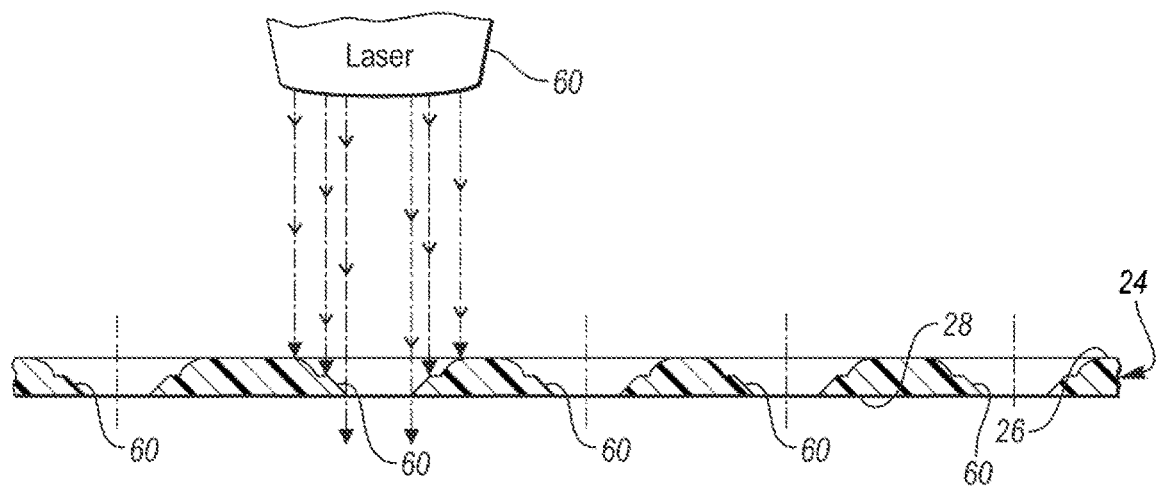

FIG. 12A includes substrate holes having a diameter of 1.3 mm; FIG. 12B of 2.2 mm; and FIG. 12C of 3.0 mm;

FIG. 13A is a schematic, perspective view of a program-controlled industrial robot drilling holes in the fixtured substrate of FIG. 2 via a focused laser beam; various work positions of an end effector of the robot are illustrated by phantom lines; and FIG. 13B is a side view, partially broken away and in cross-section, taken along lines 13B-13B of FIG. 13A showing the use of different focused laser beams to drill the holes of FIGS. 11 and 13A.

DETAILED DESCRIPTION OF EXAMPLE EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
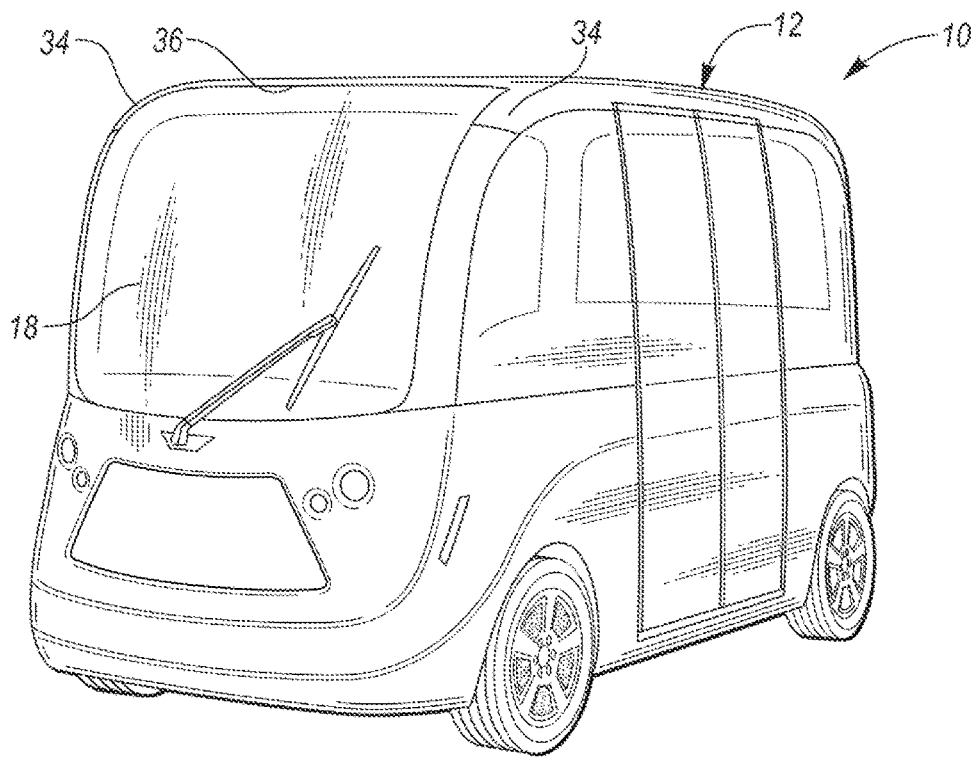
FIG. 1 is an exterior perspective, environmental view of an autonomous vehicle for which at least one embodiment of the present invention can be used.

Referring now to the drawing Figures, FIG. 1 illustrates an autonomous vehicle, generally indicated at 10, in which at least one embodiment of the present invention can be employed. The vehicle 10 can include a number of sensors such as a microphone to generate sensor data for use by the vehicle's electronic control unit (ECU) as well as a controller disclosed herein.

Figure 3:
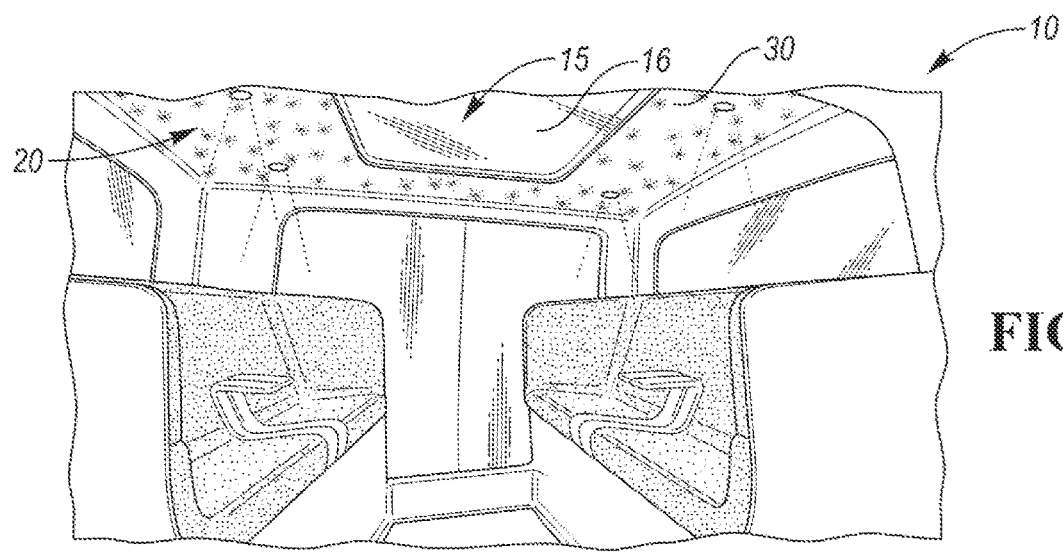
FIG. 3 is an interior perspective view, partially broken away, of a seating area within the vehicle of FIG. 1 showing various interior lighting systems including constellation and dome lighting systems.

Referring to FIGS. 1-3, the vehicle 10 is illustrative of any type of automobile or other vehicle in which at least one embodiment of the present invention can be used. For example, the vehicle 10 may include, but is not limited to, a car, a truck, an SUV, a semi-truck, a tractor, a boat, a train, etc. A roof, generally indicated 12, covers a passenger compartment (not separately numbered, but shown in FIG. 3) in which passengers or occupants of the vehicle 10 ride.

The roof 12 includes a moonroof opening 14. For purposes of this description, the terms sunroof and moonroof are used interchangeably, such that the moonroof opening 14 may alternatively be referred to as a sunroof opening. A moonroof assembly, generally indicated at 15, fills the moonroof opening 14 and some of the adjacent structure of the roof 12. The moonroof assembly 15 facilities sliding, tilting, or other movement of a glass or opaque panel 16 that selectively covers the moonroof opening 14.

The roof 12 is bounded by a windshield or windscreen 18 at a forward position of the vehicle 10, relative to the direction of travel. Similarly, the roof 12 generally terminates at a similar window or windscreen at a rearward potion of the vehicle 10. The windscreen 18 and the windscreen at the rear may be different in production vehicles.

A headliner assembly, generally indicated at 20, sits below the roof 12 and includes components providing a functional and an aesthetic barrier between the roof 12 and the passenger compartment. The headliner assembly 20 includes multiple components and may also be referred to as a headliner or low-profile display assembly.

The headliner 20 is preferably, a lightweight, thermoplastic headliner, constructed in accordance with at least one embodiment of the present invention. The headliner 20 includes a stiff, self-supporting, substrate or thermoplastic sheet, generally indicated at 24, which is adapted to be mounted adjacent the roof 12 so as to underlie the roof 12 and shield the roof 12 from view. The sheet 24 has an upper surface or face 26 and a lower surface or face 28 (FIG. 11).

The headliner 20 may be attached to the vehicle roof 12 at a frame structure by double-sided tape or a heat-activated adhesive may be applied to a top surface of the frame structure. Alternatively, the upper surface 26 of the thermoplastic sheet 24 may be provided with integrally formed fasteners (not shown) to fasten the headliner 20 to complementarily-formed fasteners (not shown) formed on the lower surface of the vehicle roof 12.

The thermoplastic resin of the thermoplastic sheet 24 may be TPO, ABS, or polypropylene with a mold-in color, such as black. The thermoplastic sheet 24 is stiff and self-supporting, yet is flexible enough to bend slightly so that the headliner 20 can be inserted between two spaced apart pillars 34 of the vehicle roof 12 which help to define a front windshield opening 36. The substrate 24 is dimensionally stable and may be formed from other materials such as hard foam, plastic, wood, or composites.

Facing material or cover 30 of the headliner 20 has an A-surface and covers the substrate 24 and spans substantially the entire headliner 20. The cover stock or cover 30 may be formed by bonding a decorative, textile sheet or fabric to the substrate 24 to give the headliner 20 a soft, padded feel. The cover stock 30 may be a single material which is both flexible and has an aesthetically pleasing tactile surface. The cover stock 30 is wrapped, pulled, and adhered over the substrate 24. The cover stock 30 may be compressible and flexible, such that the cover stock 30 may be bent or pulled around tight corners and may have a variable thickness depending upon the assembly process.

The display assembly 20 also includes a forward or first set of lighting display panels, generally indicated at 32, and a rearward set of lighting display panels, generally indicated at 33. Each set of the display panels 32 or 33 preferably includes printed circuit boards 38 and 39 all of which preferably support a plurality of semiconductor-based lighting devices, generally indicated at 42. The printed circuit board 38 of the first set 32 not only supports a plurality of lighting devices 42 at a front face 40 thereof, but also supports a first controller, generally indicated at 40, on a rear face 41 thereof for controlling the semiconductor-based lighting devices 42.

Each of the lighting devices 42 preferably comprises a RGB LED surface mounted device (i.e SMD). Each device 42 contains an integrated circuit (IC) which includes a control circuit having a current driver and signal processing circuitry necessary to control and activate the LED function. In particular, each control circuit preferably includes a signal shaping amplifier circuit, a constant current driver circuit and an RC oscillator.

Figure 10:
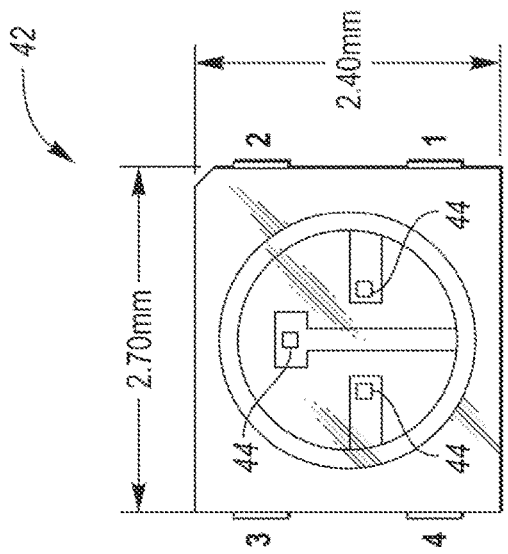
FIG. 10 is a top plan schematic view of an RGB LED device; with dimensions in millimeters (i.e. mm)
Figure 9:
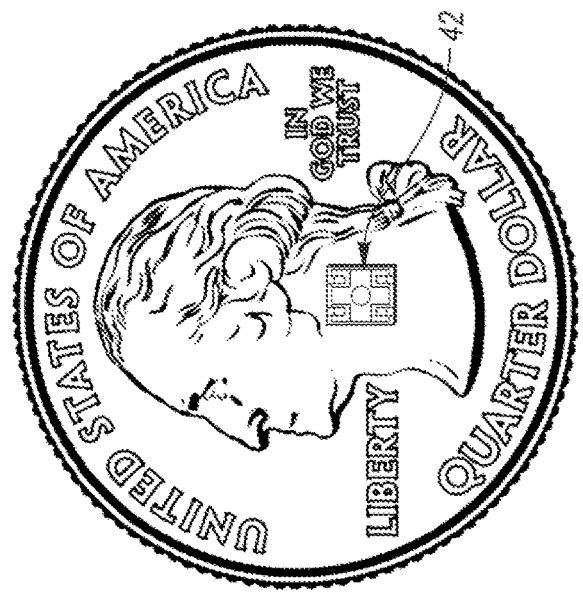
FIG. 9 is a top plan view of a U.S. quarter supporting one of the RGB LEDs at its upper (i.e. head) surface to show the relative size of the lighting device.

Preferably, each lighting device 42 has a package size and pinouts as well as LED support locations 44 as shown in FIG. 10. Each lighting device 42 may be supplied by Sun-Wave of Korea and, preferably, comprises an RGB LED device integrated with its IC. The Sun-Wave devices 42 operates in the 800K Hz range. The devices 42 are serially interconnected by signal traces 43 on their respective PC boards 38 and 39 as shown in FIGS. 6A-6H.

FIGS. 6A-6H show the devices 42, their interconnecting signal traces 43, and their relative locations on their PC boards 38 and 39 to represent a group of celestial bodies such as stars at the front of the assembly 20 as shown in FIG. 3.

Figure 7:
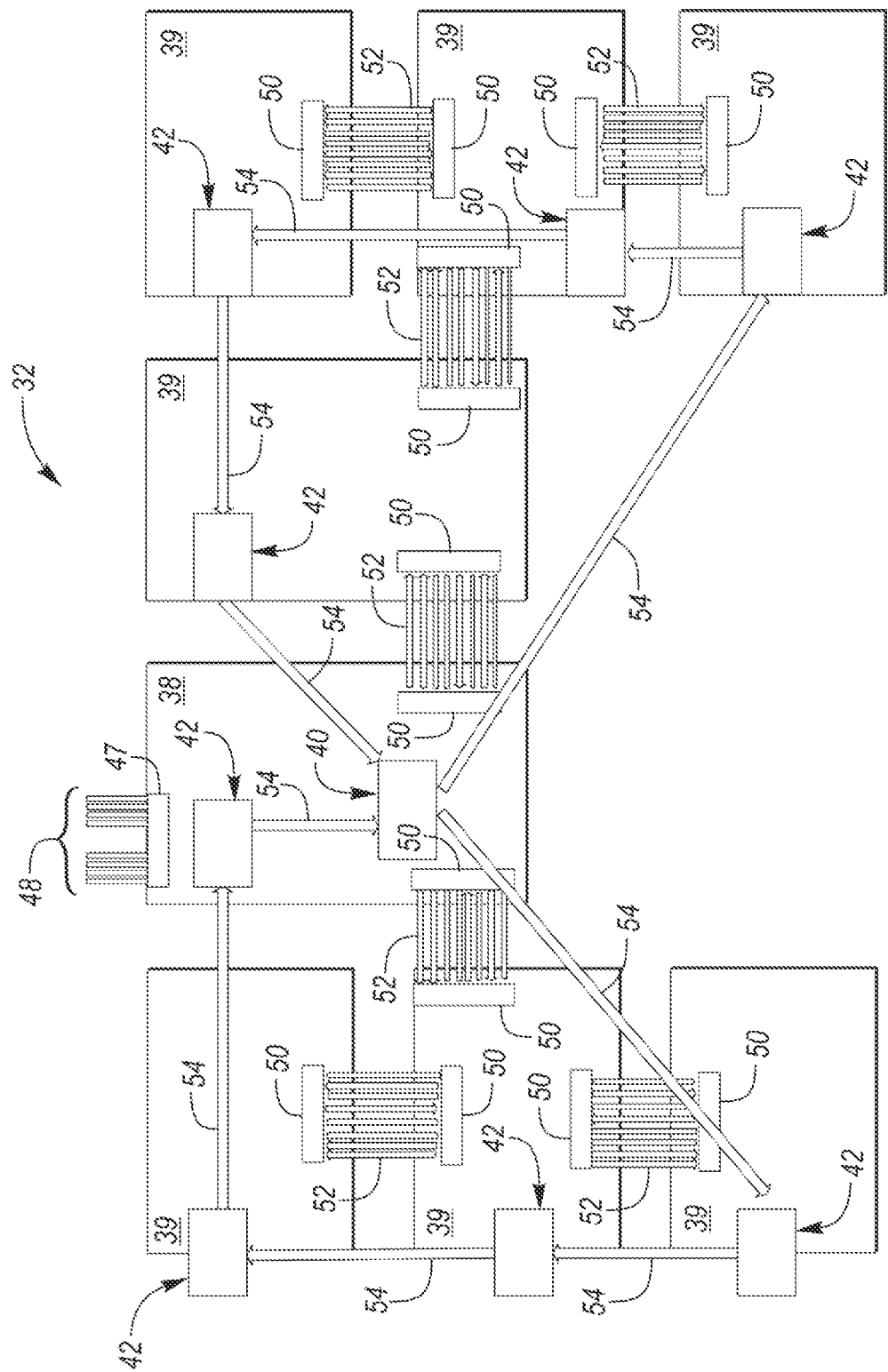
FIG. 7 is a block diagram, schematic view of a set of interconnected printed circuit boards and associated circuitry mounted thereon; two such sets are typically used with a vehicle headliner substrate to create computer-generated imagery within the passenger compartment of FIG. 3.

Referring now to FIG. 7, the PC board 38 having the controller 40 supported and mounted thereon is connected to the PC boards 39, which, in turn, are connected together by electrical connectors 50 and internal buses 52. The internal buses 52 connect the controller 40 to the devices 42 in a daisy chain configuration as shown in FIG. 8B. The assembly 20 implements serial peripheral interface (SPI) and its devices are connected in the daisy chain configuration. The PC board 38 having the controller 40 is connected to the vehicle's electronic control unit 46 via a connector 47 (FIG. 7) and a vehicle-based bus such as a CAN bus 48.

The CAN bus 48 typically has lines or conductors for various command or control signals and data to and from the remote control unit 46 and the controller 40. The internal busses 52 typically have lines or conductors for electrical power and command or control data signal to and from the controller 40 and each device 42. Arrows 54 represent the flow of signals from the controller 40 to the serially connected devices 42 mounted on their respective PC boards 38 and 39 and back to the controller 40.

Figure 4:
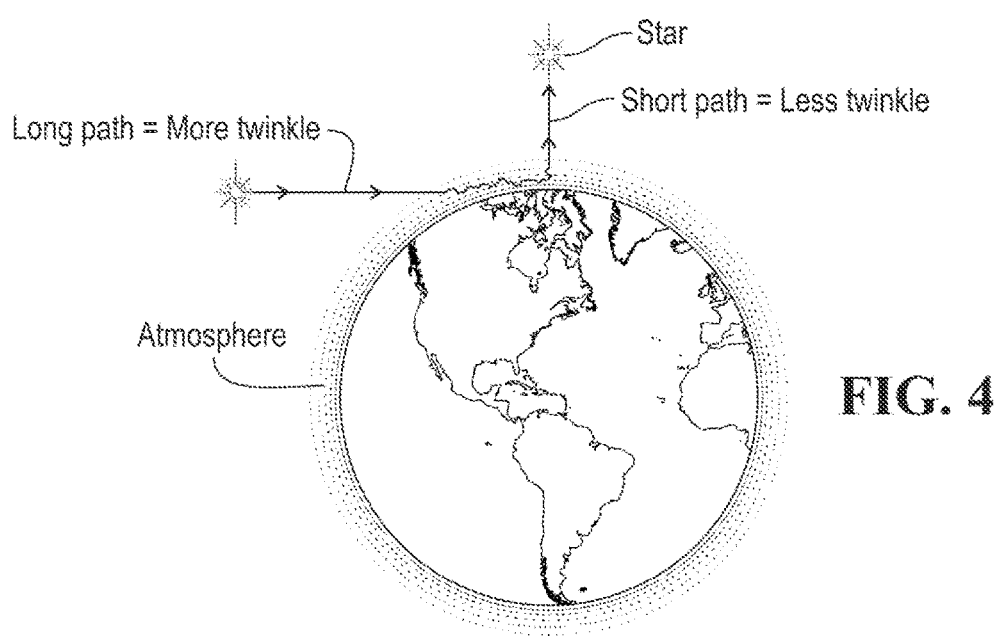
FIG. 4 is a schematic view of the planet earth, its atmosphere and a pair of stars which illustrate twinkling caused by moving air pockets in the atmosphere.
Figure 5:
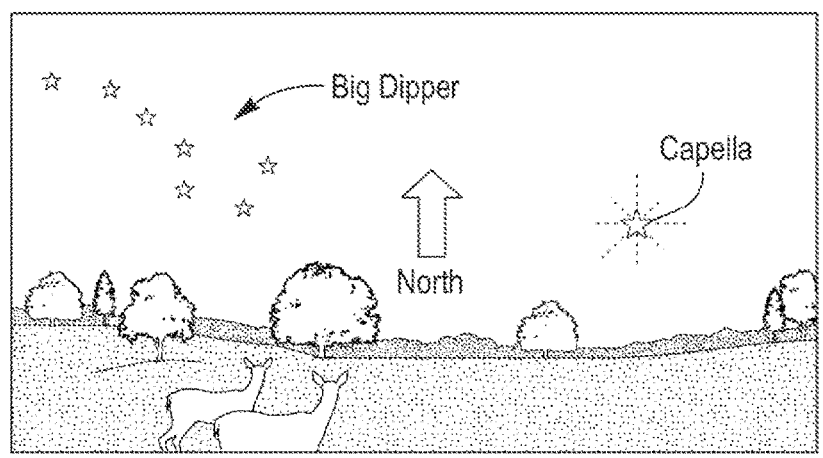
FIG. 5 is a schematic view, partially broken away, of the planet earth, the Big Dipper and the star, Capella.
Figure 6A:
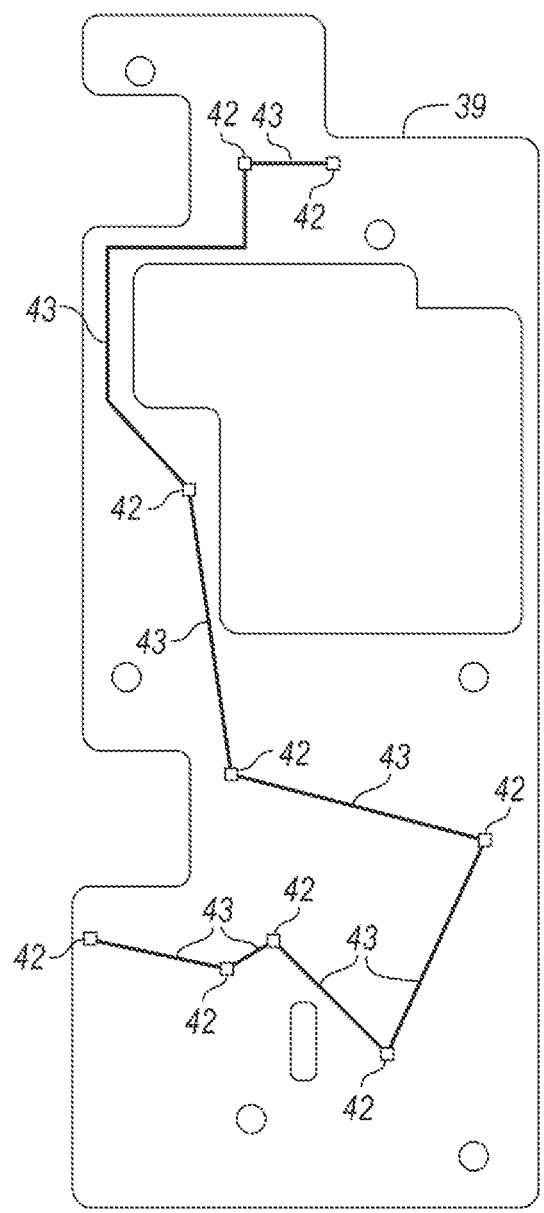
FIGS. 6A-6H are schematic views of printed circuit boards populated with RGB LED devices interconnected by signal traces; each of the devices represents a celestial body such as a star when energized.
Figure 6B:
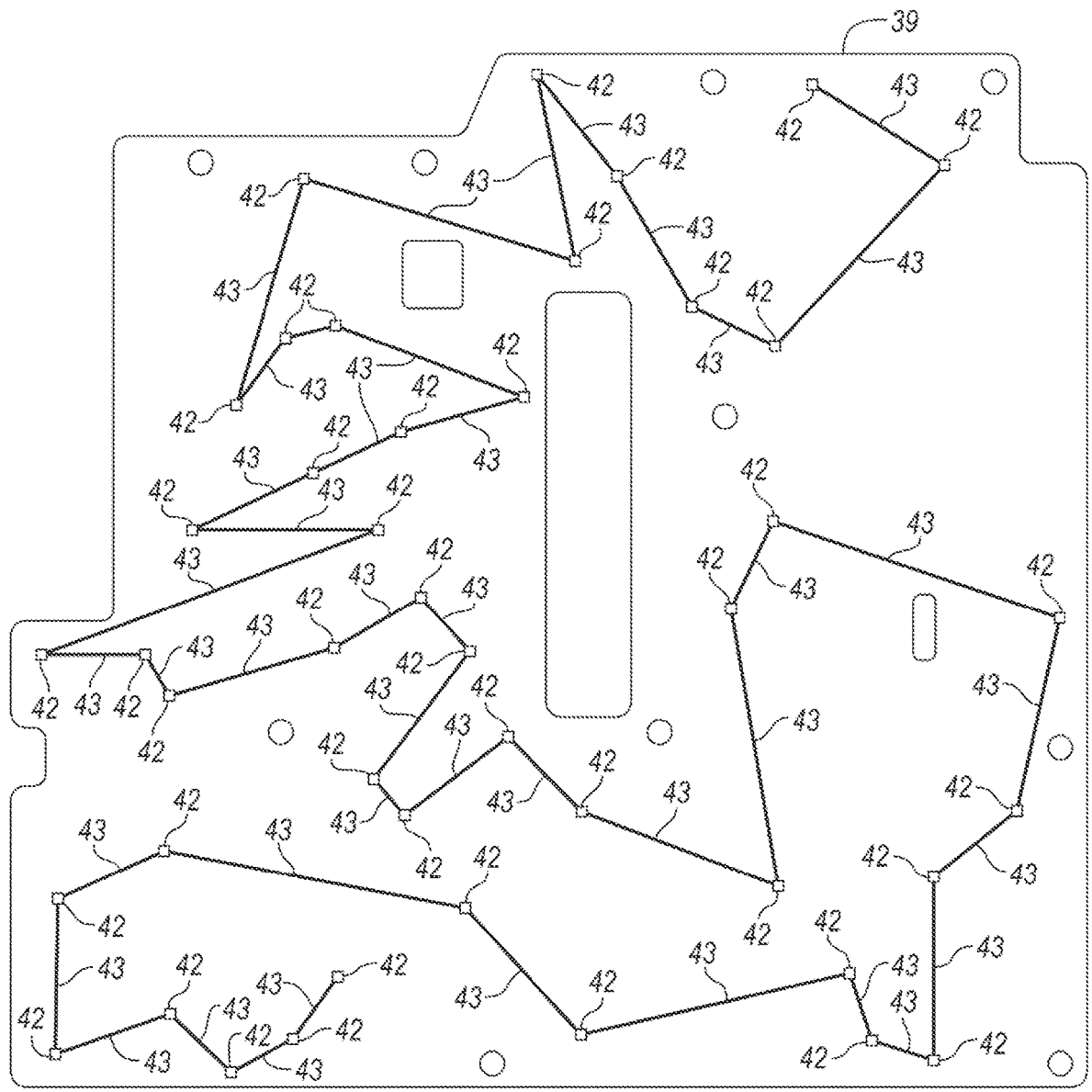
Figure 6C:
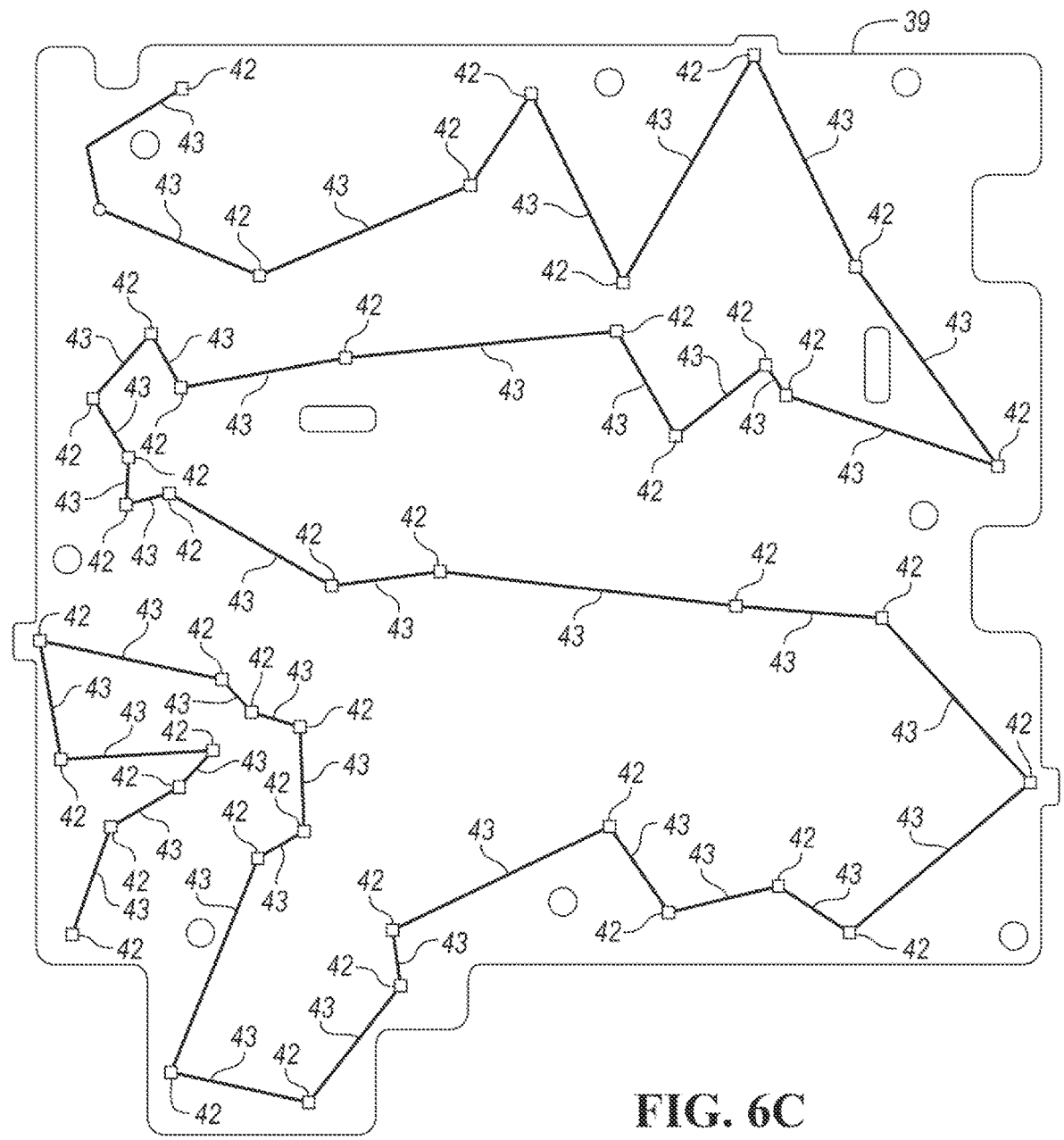
Figure 6D:
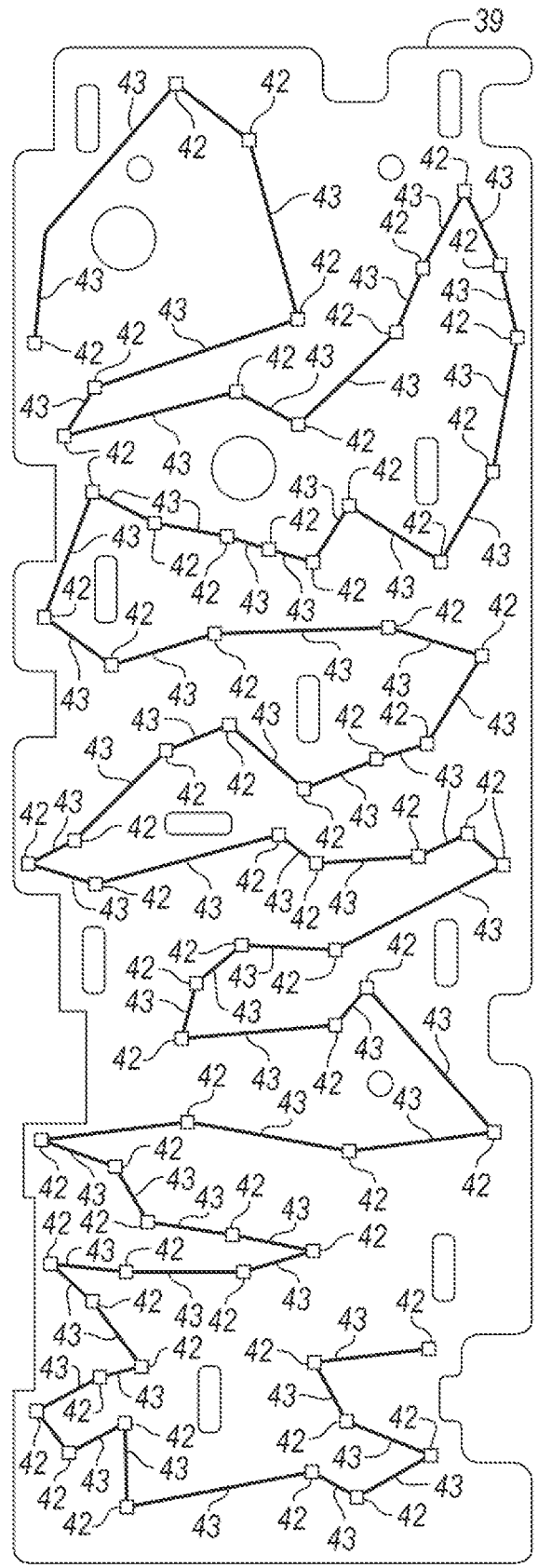
Figure 6E:
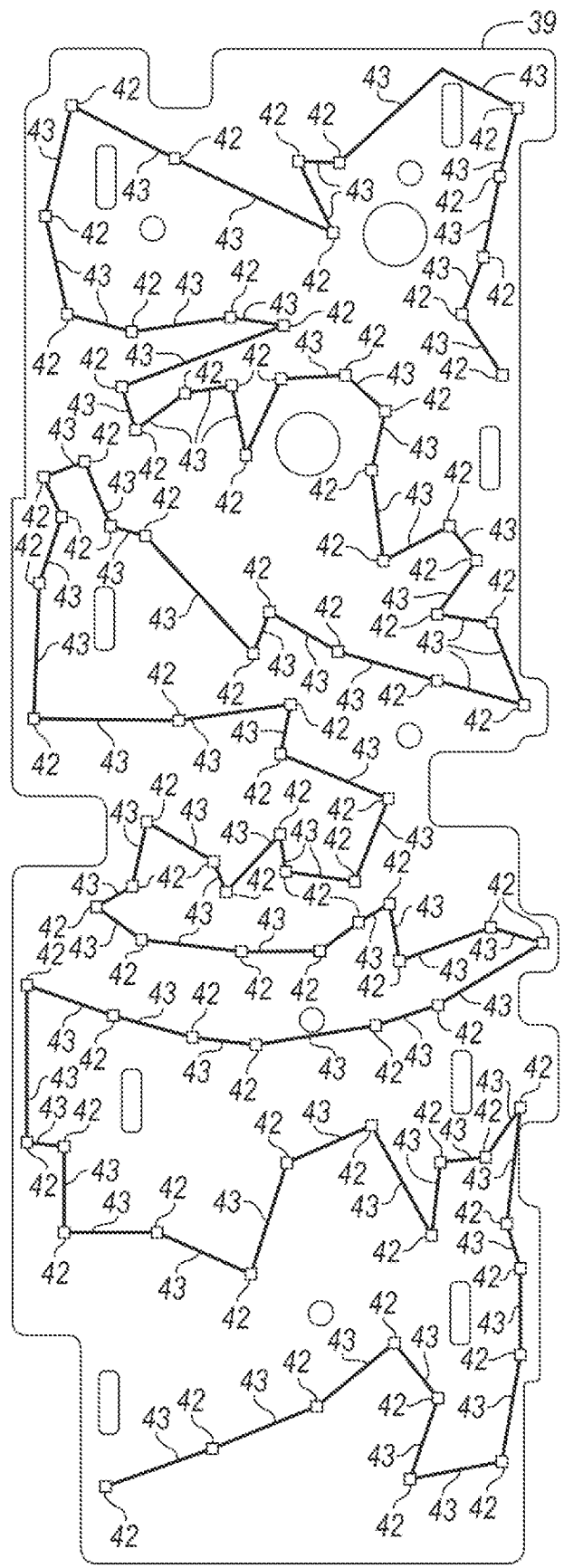
Figure 6F:
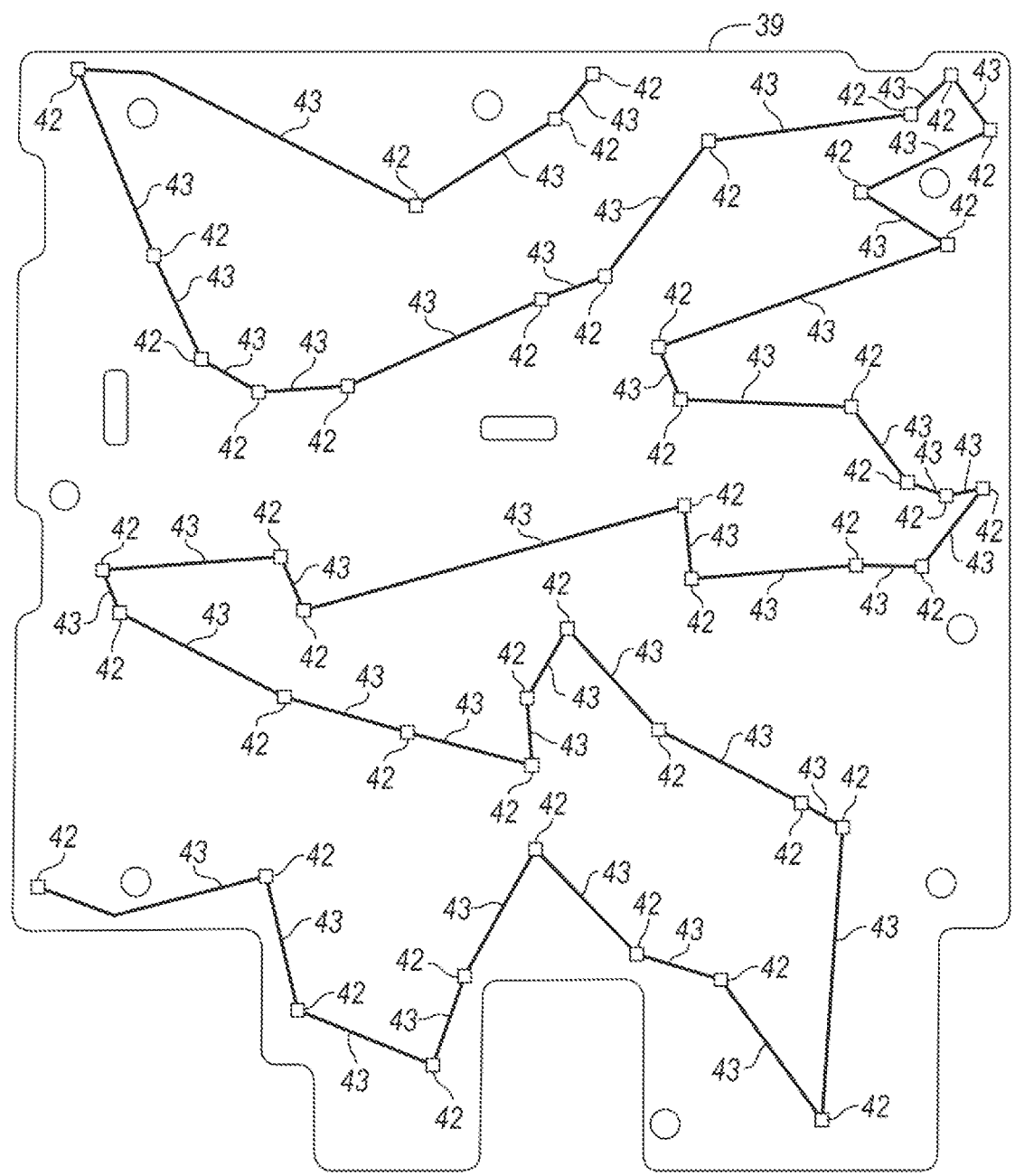
Figure 6G:
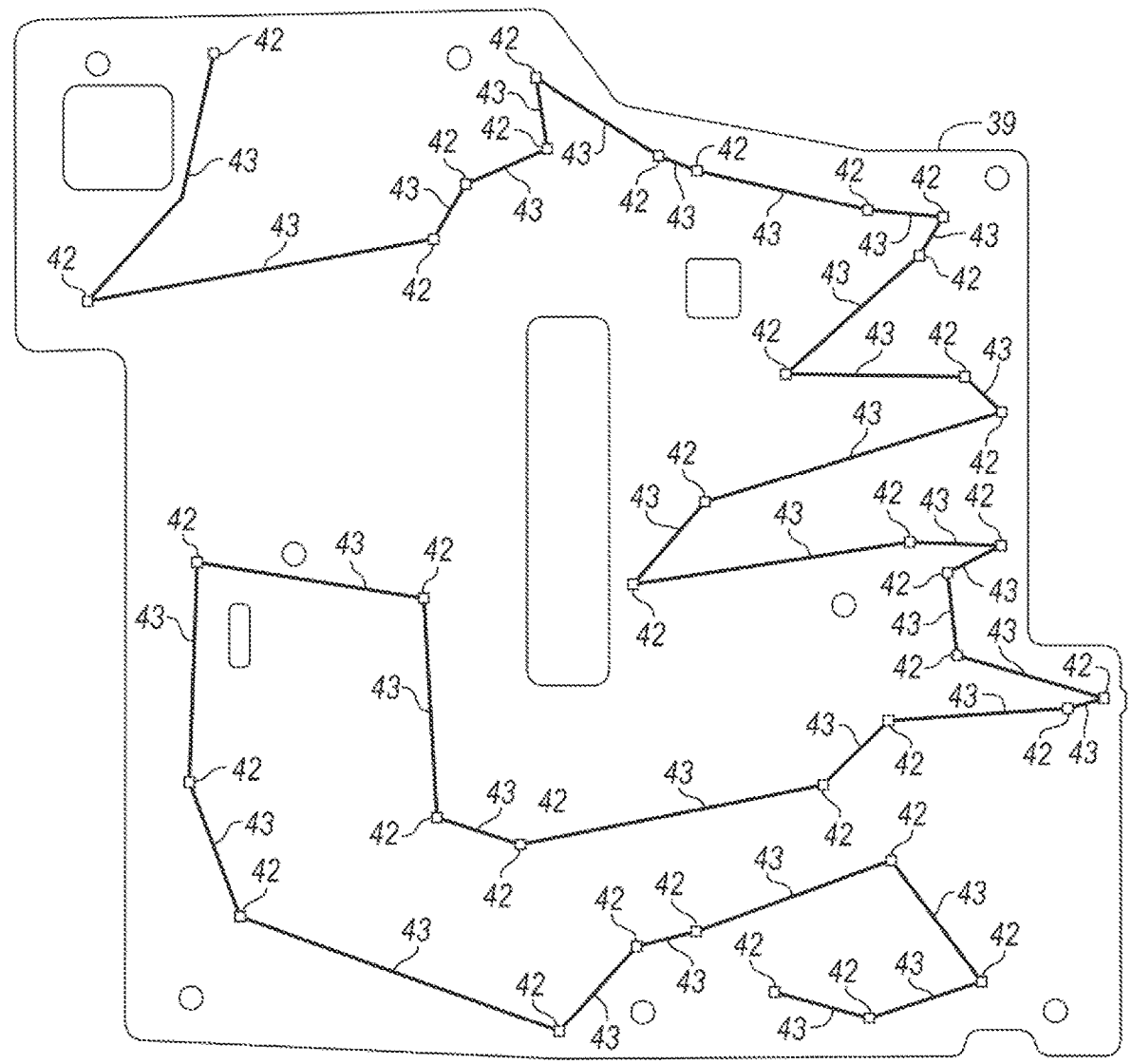
Figure 6H:
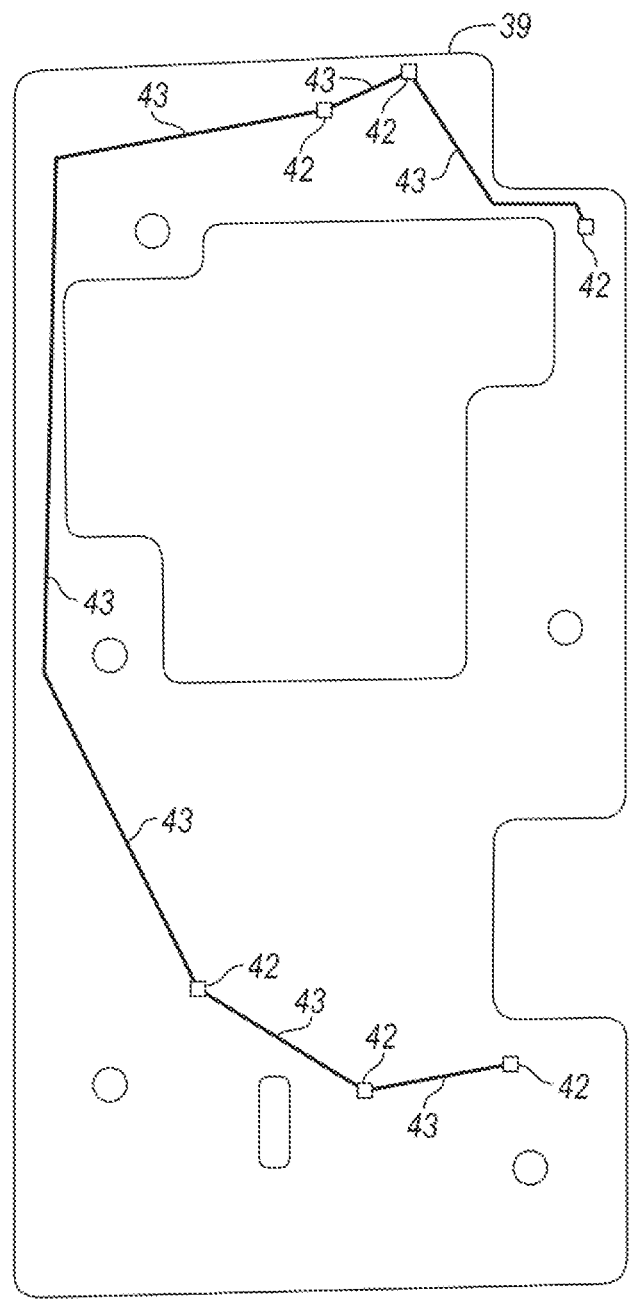

The lighting devices 42 are mounted and suspended on their respective display panels or boards 38 and 39 so that each lighting device 42 is aligned with a funnel-shaped hole or aperture 60 formed completely through the substrate 24 to create a pattern of lights which represent celestial bodies such as stars (i.e. as shown in FIGS. 3, 4 and 5) in the passenger compartment of the vehicle 10 when the lighting elements (i.e. LEDs) of the devices 42 are energized. The lighting devices 42 and their associated holes 60 are sized and shaped to create pixels of computer-generated images at the front of the assembly 20 within the passenger compartment of the vehicle 10. The images may include static images or dynamic or animated images when one or more of the stars twinkle or scintillate.

Each lighting device 42 has no visible surface area, and appears as a point light source, such as a star. Objects such as the Sun, Moon, and planets are called extended sources because the light is emitted from a disc. Objects such as distant starts are called point sources because they appear to be a point as they are very far away.

Both stars and planets twinkle. The twinkling is due to the turbulent air in the Earth's atmosphere, blurring and distorting the image of the star. Twinkling has more of an effect nearer to the horizon, where the light must travel through more of the densest parts of the Earth's atmosphere as shown in FIG. 4. When a star is near the horizon, atmospheric refraction is strong enough to create images of the star in nearly every color of the rainbow (i.e. every color of the visible spectrum).

Every year in autumn, people in the Northern Hemisphere see a bright star twinkling with red and green flashes, low in the northeastern sky. That star is Capella, as shown in FIG. 5 together with the Big Dipper.

A pixel is a physical point in an image, or the smallest addressable element in an all-points, addressable display device as disclosed herein. A pixel is the smallest controllable element of a picture or image represented on a screen or display device. The intensity and, consequently, the color of each pixel of the present invention is variable. In color imaging or display systems, a color is typically represented by three or four component intensities such as red, green, and blue or cyan, magenta, yellow and black.

Figure 8A:
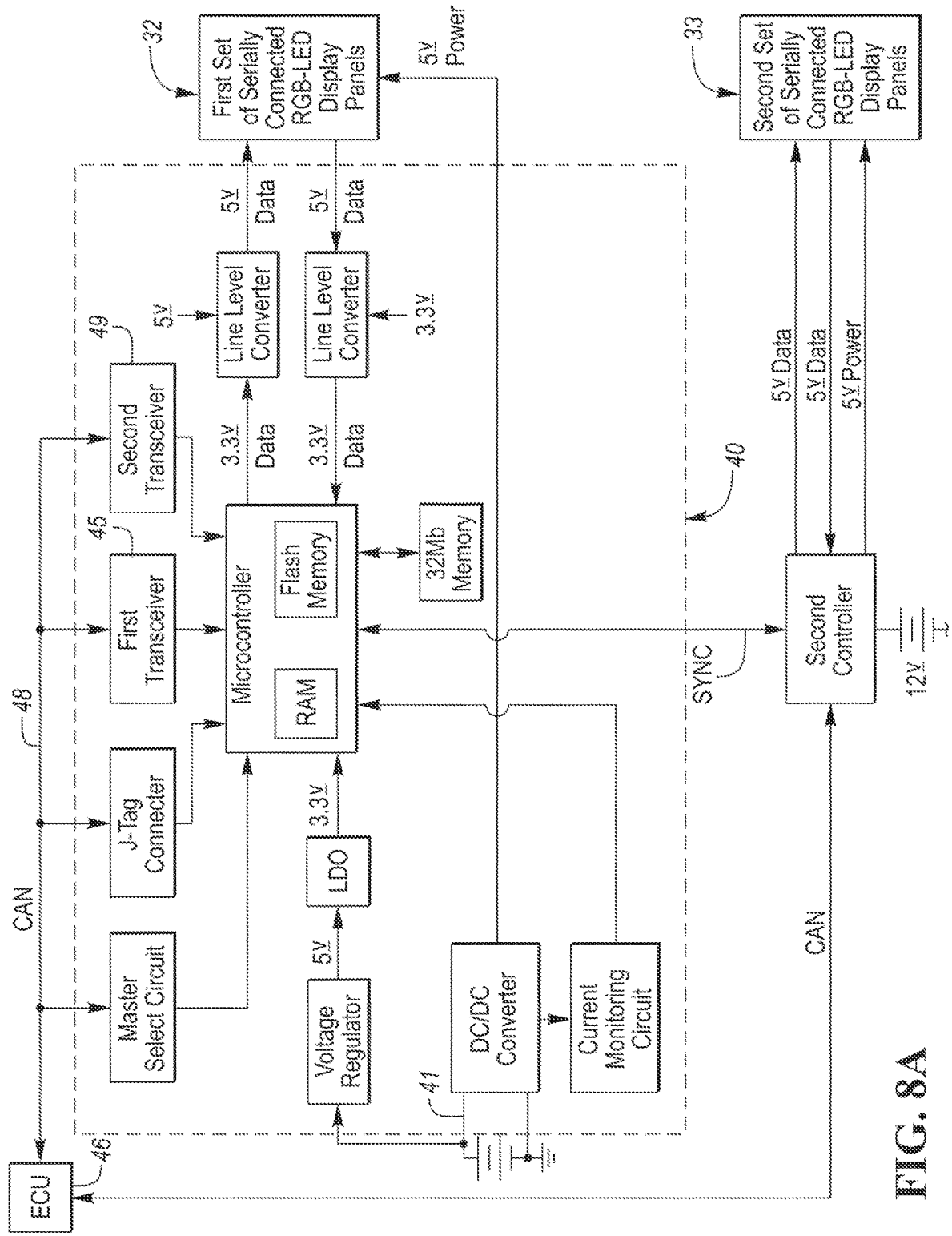
FIG. 8A is a block diagram schematic view of first and second controllers for controlling first and second sets of serially connected RGB-LED display panels, respectively; the first controller is shown in detail.
Figure 8B:
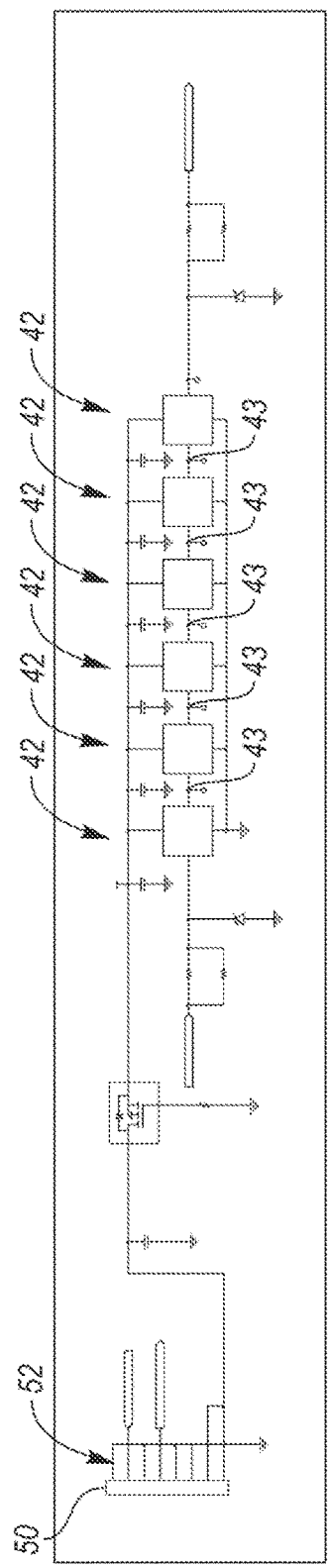
FIG. 8B is a schematic view of a plurality of serially connected RGB LEDs, decoupling capacitors, connector and other discrete circuit elements which populate the printed circuit board of FIG. 6H.

Referring now to FIG. 8A, the controller 40 includes a power inlet terminal 41 adapted to receive electrical power from a vehicle 12 volt DC power source and a command input terminal via a first transceiver 45 adapted to receive command signals from the remote electronic control unit (ECU) 46. The controller 40 could be implemented or realized with discrete logic or a microcontroller (i.e. MCU) depending on the system's requirements.

The controller 40 preferably includes the microcontroller including control logic which may alternatively be found within other circuitry. The controller 40 typically receives command signals at the input terminal via the first transceiver 45 from the remote electronic control unit (ECU) 46 over or through a vehicle-based bus 48 (i.e. CAN). Command signals are interpreted by the microcontroller. The microcontroller generates control data signals which, in turn, are received by the control circuits of the lighting devices 42. The microcontroller could be replaced with an FPGA or an extensive array of discrete modules.

An LDO (i.e. low dropout) DC linear voltage regulator provides regulated voltage to the MCU after initial voltage regulation by a voltage regulator coupled to the terminal 41 which receives the battery voltage.

The remote ECU 46 typically has a microprocessor, called a central processing unit (CPU), in communication with a memory management unit (MMU). The MMU controls the movement of data among the various computer readable storage media and communicates data to and from the CPU. The computer readable storage media preferably include volatile and nonvolatile storage in read-only memory (ROM), random-access memory (RAM), and keep-alive memory (KAM). For example, KAM may be used to store various operating variables while the CPU is powered down. The computer-readable storage media may be implemented using any of a number of known memory devices such as PROMs (programmable read-only memory), EPROMS (electrically PROM), EEPROMs (electrically erasable PROM), flash memory, or any other electric, magnetic, optical, or combination memory devices capable of storing data, some of which represent executable instructions, used by the CPU in controlling the display assembly 20 or vehicle into which the display assembly 20 is mounted.

The computer-readable storage media may also include floppy disks, CD-ROMs, hard disks, and the like. The CPU communicates with various sensors, switches and/or actuators directly or indirectly via an input/output (I/O) and actuators directly or indirectly via an input/output (I/O) interface or vehicle bus (i.e., CAN, LIN, etc.) The interface may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. Some controller architectures do not contain an MMU. If no MMU is employed, the CPU manages data and connects directly to ROM, RAM, and KAM coupled to the MMU or CPU depending upon the particular application.

The various components or functions of the controller 40 of FIG. 8A are preferably implemented by the separate or stand alone controller as illustrated, depending upon the particular application and implementation. The MCU of the controller 40 typically includes the control logic to control the lighting devices 42. The control logic may be implemented in hardware, software, or a combination of hardware and software.

The controller 40 of FIG. 8A comprises power circuitry for powering the lighting device 40, and the MCU (through the LDO) from the vehicle's 12 VDC power supply. In normal operation, with the vehicle's 12 VDC present, the microcontroller's power will be sourced through the input terminal 41 that receives the vehicle's 12 VDC power.

As will be appreciated by one of ordinary skill in the art, one or more memory devices within the ECU and/or the controller 40 may store a plurality of activation schemes for the lighting elements of the lighting devices 42 and may represent any one or more of a number of computer-based images such as stars which may twinkle or flash in various colors.

Preferably, the control logic is implemented primarily in software executed by a microprocessor-based controller 40 or the microcontroller (i.e. MCU). Of course, the control logic may be implemented in software, hardware, or a combination of software and hardware depending upon the particular application. When implemented in software, the control logic is preferably provided in a computer-readable storage medium having stored data representing instructions executed by the computer of the microcontroller to control the individual lighting elements of the assembly 20. The computer-readable storage medium or media may be any of a number of known physical devices which utilize electric, magnetic and/or optical devices to temporarily or persistently store executable instructions and associated calibration information, operating variables, and the like.

The vehicle bus such as the local interconnect network (LIN) or the CAN bus 48 is capable of two-way communications. A battery voltage power line and a ground line is provided to the controller 40. The controller 40 typically includes a transceiver interface either within or outside (as shown in FIG. 8A) the MCU.

The power sources or supplies of the controller 40 supply electric power of predetermined voltage levels to the MCU and each set of display panels 32 and 33 through the LDO and a DC/DC converter, respectively. Each transceiver 45 or 49 is a communications interface circuit connected to the network or vehicle bus 48 for communications and operates as a receiver section for the MCU and a transmitter section back to the ECU.

The MCU of the controller 40 typically includes one or more memory circuits and may be configured as a conventional microcomputer including a CPU, a ROM, a RAM, and the like or as a hardwired logic circuit.

The controller 40 may perform data communications regularly through the CAN bus 48. In such data communications, the controller 20 may transmit static data indicating the state of each lighting device 42 to the ECU 46.

The following are examples of electronic circuitry for each of the controllers of FIG. 8A and which are substantially identical:

The two controllers exercises control over all system aspects of the celestial headliner lighting system or assemblies. Each controller includes a central CPU (central processing unit), three direct current power supplies, a 32 Mb flash memory device, 2 CAN interfaces, a set (2) of line level converters, and a group of discreet components (master select circuit) to execute a master select feature. The master select circuit allows for the identification of which of the two sets of panels 32 and 33 is given synchronizing control over the other set of panels. It also contains a current sensing feature via a current monitoring circuit which detects when the load drops through the DC/DC converter and, informs the microcontroller when this happens. This circuit detects when LEDs become non-functional and do not draw power from the power supply. The different devices include:

CPU (i.e. microcontroller): an NXP device is used with dual SPI outputs to drive the serial control data signals sent to the LEDs of the devices 42. The microcontroller internally has 2 Mb of flash memory and 256 Kb of RAM. It is the central control and monitor of all electronic signals of the system.

Power supply 1: A DC/DC converter is used to supply 5-volt power the all the LEDs of the devices 42 on the 8 panel set of panels. It has an input from the vehicle 12-volts power supply. This supply is enabled and monitored by the microcontroller.

Power supply 2. A voltage regulator regulates the voltage from a 12-volt input to a 5-volt output. It supplies power to the 2 CAN interfaces, one of the two line level converters, current sense and master select groups of components. This supply is also monitored by the microcontroller.

Power supply 3: This supply has a 5-volt input from power supply 2 and regulates a 3.3 v output. This 3.3 volt source powers the microcontroller, a 32 Mb memory chip, the second line level converter, and both the CAN interface ports. This supply is also monitored by the microcontroller.

Memory Chip: A 32 Mb flash memory chip is connected directly to the microcontroller. This is utilized to store large animation data files which are used to generate the imagery.

CAN ports: There are 2 identical CAN ports on the control panel 38. The first port and its transceiver 45 allows the vehicle 10 to exercise control over the controller 40. The second CAN port with its transceiver 49 is implemented to allow for audio input control signals for the ECU 46 over the CAN 48 to synchronize the LED brightness levels to music or sound.

Line level converters: There are two line level converters. One is used to convert the 3.3 v output from the microcontroller to a 5 v level to drive control data signals to the RGB LEDs. The second line level converter converts the voltage of the control data signals from the LEDs (5 v) back into 3.3v and into the microcontroller. Preferably, the control data signals are 24-bit, 8 bits for each LED.

J-Tag Connector. A standard 20 pin J-Tag connector allows access to the processor of the microcontroller for programming and flashing purposes.

FIGS. 13A and 13B illustrate laser drilling of holes 60 in the substrate 24 held by a fixture 61 using a laser 60 mounted as an end effecter at the distal end of the arm of a robot 64. It is to be understood that the laser includes a lens to provide focused beams of laser energy to drill the funnel-shaped holes 60.

Figure 12C:
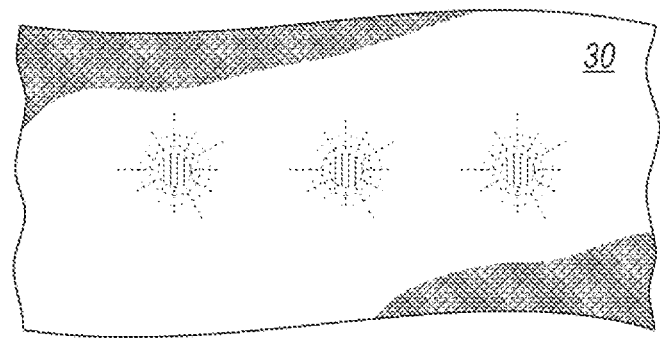

FIGS. 12A, 12B, and 12C are example bottom views showing lighting devices 42 emitting light through a porous, light-transmitting cover stock 30 after the light rays from their LEDs have traveled through the holes 60. The holes 60 of FIG. 12a have a preferred diameter of 1.3 mm; the holes 60 of FIG. 12b have a preferred diameter of 2.2 mm and the holes of FIG. 12c have a preferred diameter of 30 mm. Obviously, holes of different diameters may be used to represent stars or other objects or point-light sources of different sizes.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A low-profile display assembly for a vehicle, the assembly comprising:
   a substrate having front and rear faces and a plurality of holes extending from the rear face to the front face;
   at least one lighting display panel having front and rear faces; and
   a plurality of semiconductor-based, lighting devices supported by each of the display panels between the front face of at least one display panel and the rear face of the substrate, each of the lighting devices including multicolored lighting elements, each of the lighting elements being individually addressable to control the intensity of the lighting elements wherein each of the lighting devices is aligned with one of the holes so that light emitted by each of the lighting devices travels through its hole to the front of the assembly in the form of a pixel of a computer-generated image and wherein color of light emitted by each of the lighting devices is controlled by controlling the intensity of light emitted by its lighting elements.

2. The assembly as claimed in claim 1, wherein the substrate comprises a stiff, self-supporting sheet adapted to be mounted adjacent a roof of the vehicle so as to underlie the roof and shield the roof from view and wherein the computer-generated images are displayed within a passenger compartment of the vehicle.

3. The assembly as claimed in claim 1, wherein each of the lighting devices includes a control circuit to individually control each of the lighting elements.

4. The assembly as claimed in claim 1, wherein a plurality of electrically coupled display panels overlie the substrate.

5. The assembly as claimed in claim 1, wherein each of the display panels comprises a printed circuit board.

6. The assembly as claimed in claim 2, wherein the substrate is a polymeric substrate.

7. The assembly as claimed in claim 6, wherein the substrate is a thermoplastic substrate.

8. The assembly as claimed in claim 1, further comprising a porous decorative cover overlying and bonded to a front face of the substrate to create a cosmetically acceptable appearance for the assembly, wherein light from each of the lighting devices is transmitted through the decorative cover to form the computer-generated images.

9. The assembly as claimed in claim 8, wherein the decorative cover is a decorative fabric or cloth liner attached to the front face of the substrate.

10. The assembly as claimed in claim 1, wherein the computer-generated images represent static scenes.

11. The assembly as claimed in claim 1, wherein the computer-generated images includes dynamic or animated images.

12. The assembly as claimed in claim 3, wherein the control circuit controls the color of the light emitted from the each of the lighting devices.

13. The assembly as claimed in claim 3, wherein the control circuit controls the intensity of the light emitted from its lighting device.

14. The assembly as claimed in claim 1, wherein each of the lighting devices is a point light source.

15. The assembly as claimed in claim 14, wherein one of the computer-generated images represents a group of celestial bodies at the front of the assembly.

16. The assembly as claimed in claim 15, wherein the lighting elements of at least one of the lighting devices is controlled so that its associated celestial body appears to twinkle or scintillate.

17. The assembly as claimed in claim 1, wherein the holes are funnel-shaped to at least partially house the lighting devices at the rear face and to direct light emitted by the lighting devices to the front face.

18. The assembly as claimed in claim 15, wherein the substrate is substantially black to represent a dark background for the celestial bodies.

19. A robust display assembly for a vehicle, the assembly comprising:

a substrate having front and rear faces and a plurality of funnel-shaped holes extending from the rear face of the substrate to the front face of the substrate;

first and second sets of lighting display panels overlying the rear face of the substrate; and a plurality of semiconductor-based, lighting devices supported by each of the display panels, each of the lighting devices including at least one lighting element, each of the lighting elements being individually addressable to control the intensity of the at least one lighting element wherein each of the lighting devices is at least partially disposed within one of the holes so that light emitted by each of the lighting devices travels through its hole to the front of the assembly in the form of a pixel of a computer-generated image.

20. A low-profile display assembly for a vehicle, the assembly comprising:

a substrate having front and rear faces and a plurality of holes extending from the rear face of the substrate to the front face of the substrate;

first and second, substantially identical, interconnected sets of lighting display panels overlying the rear face of the substrate; and a plurality of semiconductor-based, lighting devices supported by each of the display panels, each of the lighting devices including at least one lighting element, each of the lighting elements being individually addressable to control the intensity of the at least one lighting element wherein each of the lighting devices is aligned with one of the holes so that light emitted by each of the lighting devices travels through its hole in the form of a pixel of a computer-generated image.

* * * * *